(12) United States Patent
Tazume

(10) Patent No.: US 12,282,339 B2
(45) Date of Patent: Apr. 22, 2025

(54) PROCESSING SYSTEM, UNMANNED AERIAL VEHICLE, AND FLIGHT ROUTE DESIGNATION METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 1092 days.

(21) Appl. No.: 17/047,242

(22) PCT Filed: Oct. 9, 2019

(86) PCT No.: PCT/JP2019/039767
§ 371 (c)(1),
(2) Date: Oct. 13, 2020

(87) PCT Pub. No.: WO2021/070274
PCT Pub. Date: Apr. 15, 2021

(65) Prior Publication Data
US 2023/0121187 A1 Apr. 20, 2023

(51) Int. Cl.
| | |
|---|---|
| *G05D 1/00* | (2006.01) |
| *B64C 39/02* | (2023.01) |
| *B64U 20/30* | (2023.01) |
| *B64U 20/80* | (2023.01) |
| *G08G 5/00* | (2006.01) |
| *B64U 10/13* | (2023.01) |
| *B64U 101/20* | (2023.01) |

(Continued)

(52) U.S. Cl.
CPC ........... *G05D 1/106* (2019.05); *B64C 39/024* (2013.01); *B64U 20/30* (2023.01); *B64U 20/80* (2023.01); *G05D 1/0055* (2013.01); *G05D 1/12* (2013.01); *G08G 5/0008* (2013.01); *G08G 5/0034* (2013.01); *G08G 5/0069* (2013.01); *G08G 5/0091* (2013.01); *B64U 10/13* (2023.01); *B64U 2101/20* (2023.01); *B64U 2101/23* (2023.01); *B64U 2101/30* (2023.01); *B64U 2201/10* (2023.01); *B64U 2201/20* (2023.01)

(58) Field of Classification Search
CPC ........ G05D 1/106; G05D 1/0055; G05D 1/12; B64U 20/80; B64U 20/30; B64U 2201/10; B64U 2101/20; B64C 39/024; G08G 5/0008; G08G 5/0034; G08G 5/0069; G08G 5/0091
See application file for complete search history.

(56) References Cited

U.S. PATENT DOCUMENTS

| | | | | |
|---|---|---|---|---|
| 9,483,951 | B1 * | 11/2016 | McCusker | B64D 45/00 |
| 2017/0193646 | A1 * | 7/2017 | Wang | G06T 7/00 |

FOREIGN PATENT DOCUMENTS

| | | | | |
|---|---|---|---|---|
| CN | 106029236 | * | 12/2013 | B01D 47/08 |
| CN | 106029236 A | * | 10/2016 | A62C 31/02 |

(Continued)

OTHER PUBLICATIONS

International Search Report for PCT/JP2019/039767 dated, Dec. 3, 2019 (PCT/ISA/210).

*Primary Examiner* — Aryan E Weisenfeld
(74) *Attorney, Agent, or Firm* — Sughrue Mion, PLLC

(57) ABSTRACT

The UAV 1*a* includes a dust sensor 16 and a dust-preventing function 17 and performs a processing for a different UAV 1*b* not provided with a dust-preventing function on the basis of a dust amount detected by the dust sensor 16 during a flight of the UAV 1*a*.

5 Claims, 7 Drawing Sheets

(51) Int. Cl.
*B64U 101/23* (2023.01)
*B64U 101/30* (2023.01)

(56) References Cited

FOREIGN PATENT DOCUMENTS

| | | | | |
|---|---|---|---|---|
| CN | 209258390 | * 11/2018 | ............. | G01N 33/00 |
| CN | 209258390 U | 8/2019 | | |
| JP | 2018-38167 A | 3/2018 | | |

* cited by examiner

PROCESSING SYSTEM, UNMANNED AERIAL VEHICLE, AND FLIGHT ROUTE DESIGNATION METHOD

CROSS REFERENCE TO RELATED APPLICATIONS

This application is a National Stage of International Application No. PCT/JP2019/039767 filed Oct. 9, 2019.

TECHNICAL FIELD

The present invention relates to a technical field of a system and the like including an unmanned aerial vehicle provided with a sensor.

BACKGROUND ART

Conventionally, there is a known unmanned aerial vehicle provided with a dust-preventing function that prevents infiltration of dust such as sand dust. For example, Patent Literature 1 discloses a technology in which infiltration of a foreign matter such as grit and dust into a power unit of a motor housing is prevented by providing, at a facing portion between the motor housing and propeller shafts of an unmanned flying object, a foreign matter infiltration prevention means that prevents infiltration of the foreign matter into the motor housing.

CITATION LIST

Patent Literature

Patent Literature 1: JP 2018-38167 A

SUMMARY OF INVENTION

Technical Problem

Meanwhile, depending on an aerial vehicle type, it may be difficult to provide a dust-preventing function due to a weight problem or the like. Therefore, it is desirable to take some measures such that an aerial vehicle not provided with any dust-preventing function is less affected by dust.

Therefore, one or more embodiments of the present invention are directed to providing a processing system, an aerial vehicle, and a flight route designation method, in which dust prevention measures can be taken such that an aerial vehicle not provided with any dust-preventing function is less affected by dust.

Solution to Problem

In response to the above issue, certain embodiments may provide a processing system including an unmanned aerial vehicle provided with: a control unit that controls flight; a dust-preventing function that prevents at least infiltration of dust into the control unit; and a sensor that is installed at least outside the control unit and detects dust. The processing system includes: an acquisition unit configured to acquire information indicating an amount of dust detected by the sensor during flight of the unmanned aerial vehicle; and a designation unit configured to designate, on the basis of the amount of dust, a flight route where a different aerial vehicle is hardly affected by the dust. Consequently, dust prevention measures can be taken such that the different aerial vehicle is less affected by the dust.

Certain embodiments further comprise a transmission unit configured to transmit, to the different aerial vehicle, information indicating the flight route. Consequently, the different aerial vehicle can be made to fly along the flight route hardly affected by the dust.

Certain embodiments may provide a determination unit configured to determine, on the basis of the amount of dust, whether or not to drop liquid that suppresses the dust. Consequently, the dust can be suppressed to such an extent that the different aerial vehicle is not affected by the dust.

Certain embodiments may provide that the control unit transmits a follow-up control command to the different aerial vehicle, and the different aerial vehicle flies along the flight route while following after the unmanned aerial vehicle in accordance with the follow-up control command. Consequently, the unmanned aerial vehicle can adequately guide the different aerial vehicle so as not to be affected by the dust.

Certain embodiments may provide an unmanned aerial vehicle including: a dust-preventing function configured to prevent infiltration of dust; a sensor configured to detect dust; and a processing unit configured to perform processing for the different aerial vehicle on the basis of an amount of dust detected by the sensor during flight of the unmanned aerial vehicle. Consequently, dust prevention measures can be taken such that the different aerial vehicle is less affected by the dust.

Certain embodiments may provide that the processing unit performs processing of designating, on the basis of the amount of dust, a flight route where the different aerial vehicle is hardly affected by the dust. Consequently, the flight route hardly affected by the dust can be designated as the dust prevention measures that make the different aerial vehicle less affected by the dust.

Certain embodiments may provide that the processing unit performs processing of transmitting, to the different aerial vehicle, information indicating the flight route. Consequently, the different aerial vehicle can be made to fly along the flight route hardly affected by the dust.

Certain embodiments may provide that the processing unit performs processing of designating the flight route by seeking a route where the different aerial vehicle is hardly affected by the dust while the processing unit changes a travel route of the unmanned aerial vehicle on the basis of the amount of dust detected by the sensor at predetermined time intervals. Consequently, the flight route where the different aerial vehicle is hardly affected by the dust can be efficiently designated.

Certain embodiments may provide that the processing unit performs processing of transmitting, to a different device, information indicating the amount of dust. Consequently, the dust prevention measures can be taken for the different device on the basis of the information indicating the amount of dust.

Certain embodiments may provide that the different device is the different aerial vehicle. Consequently, the dust prevention measures can be taken for the different aerial vehicle on the basis of the information indicating the amount of dust.

Certain embodiments may provide that the processing unit performs processing of dropping liquid that suppresses the dust on the basis of the amount of dust. Consequently, the dust can be suppressed to such an extent that the different aerial vehicle is not affected by the dust.

Certain embodiments may provide a flight route designation method performed by a processing system including an unmanned aerial vehicle provided with: a control unit that controls flight; a dust-preventing function that prevents at least infiltration of dust into the control unit; and a sensor that is installed at least outside the control unit and detects dust. The flight route designation method includes: a step of acquiring information indicating an amount of dust detected by the sensor during flight of the unmanned aerial vehicle; and a step of designating, on the basis of the amount of dust, a flight route where a different aerial vehicle is hardly affected by the dust.

Advantageous Effect of the Invention

According to one or more embodiments of the present invention, dust prevention measures can be taken such that the different aerial vehicle is less affected by the dust.

BRIEF DESCRIPTION OF THE DRAWINGS

FIG. 2 is a diagram illustrating a schematic configuration example of an UAV 1a.

DESCRIPTION OF EMBODIMENTS

Hereinafter, an embodiment of the present invention will be described with reference to the drawings.

Incidentally, the embodiment described below is an embodiment of a case where a present invention is applied to a flight system.

[1. Configuration and Outline of Operation of Flight System S]

Figure 1:
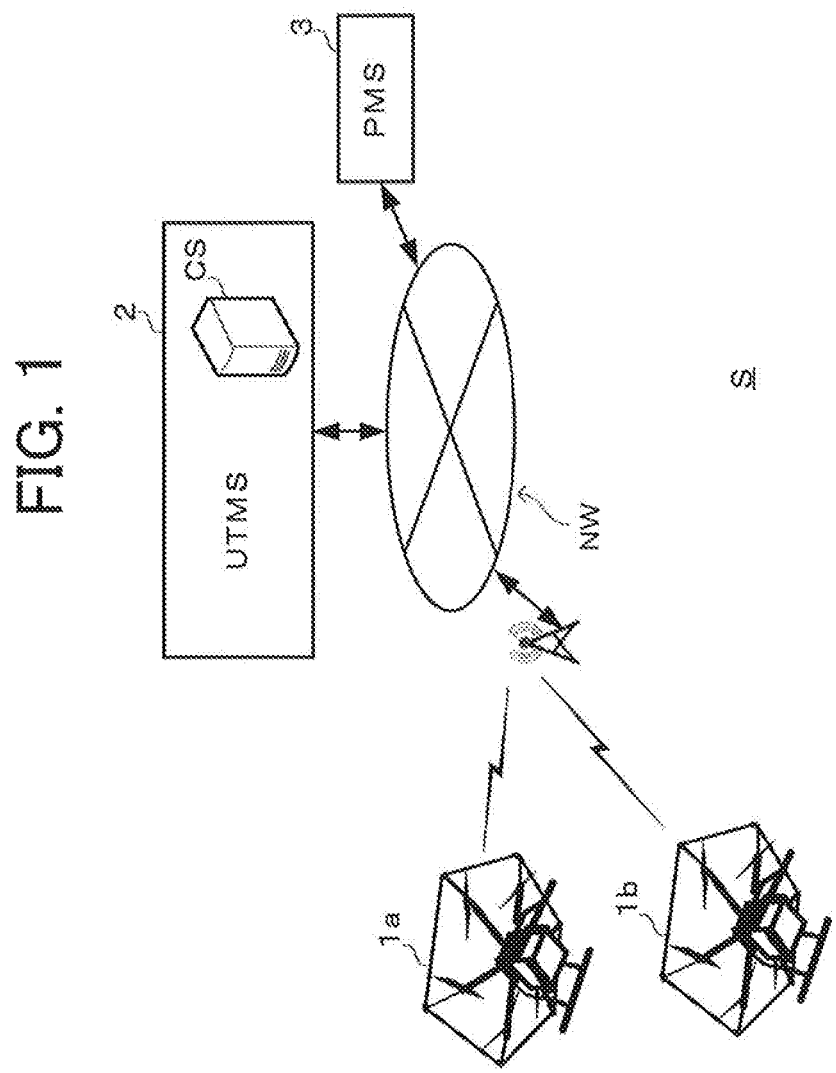
FIG. 1 is a diagram illustrating a schematic configuration example of a flight system S.

First, referring to FIG. 1, a description will be provided for a configuration and an outline of operation of a flight system S by which an unmanned aerial vehicle (hereinafter referred to as an "UAV (Unmanned Aerial Vehicle)") is made to fly for a predetermined purpose. Examples of the predetermined purpose can include transportation, surveying, image capturing, inspection, monitoring, and the like. FIG. 1 is a diagram illustrating a schematic configuration example of the flight system S. As illustrated in FIG. 1, the flight system S (an example of a processing system) includes: a UAV 1a that flies in atmosphere (in air); a UAV 1b that flies in the atmosphere; a traffic management system (hereinafter referred to as a "UTMS (UAV Traffic Management System)") 2; and a port management system (hereinafter referred to as a "PMS (Port Management System)") 3. The UAV 1a, the UAV 1b, the UTMS 2, and the PMS 3 can communicate with one another via a communication network NW. The communication network NW includes, for example, the Internet, a mobile communication network, a radio base station thereof, and the like. Incidentally, although one UAV 1a and UAV 1b are respectively shown in the example of FIG. 1, there may be more than one of each. The UTMS 2 and the PMS 3 may be configured as one management system.

The UAV 1a, UAV 1b (that is, each of UAV 1a and UAV 1b) can fly in accordance with remote control from the ground by an operator or can fly autonomously. The UAV 1a, UAV 1b are also called a drone or a multi-copter. The UAV 1a is provided with a dust-preventing function that prevents infiltration (entry) of dust. On the other hand, the UAV 1b (an example of a different aerial vehicle) is not provided with a dust-preventing function that prevents infiltration of dust. Here, the dust refers to airborne (floating) dust-like particles in the air. In the case where the particles are sand, the dust will be also referred to as sand dust (sandy dust). The UAV 1a, UAV 1b are managed by a GCS (Ground Control Station). For example, the GCS is installed as an application in a control terminal that can be connected to the communication network NW. In this case, the operator is, for example, a person who operates the control terminal to remotely control the UAV 1a, UAV 1b. Alternatively, the GCS may be configured by a server or the like. In this case, the operator is, for example, a manager in the GCS or a controller provided in the server.

The UTMS 2 includes one or more servers including a control server CS. The UTMS 2 manages traffic and flight of the UAV 1a, UAV 1b. The traffic management of the UAV 1a, UAV 1b includes management of a traffic plan of the UAV 1a, UAV 1b; management of a flight status of the UAV 1a, UAV 1b, and control of the UAV 1a, UAV 1b. The traffic plan of the UAV 1a, UAV 1b is a flight plan including, for example, a flight route (scheduled route) from a departure point (flight start point) to a destination point (or a waypoint) for the UAV 1a, UAV 1b. The flight route is represented by, for example, latitude and longitude on the route, and may include flight altitude. The management and control of the flight status of the UAV 1a, UAV 1b are performed on the basis of aircraft information of the UAV 1a, UAV 1b. The aircraft information of the UAV 1a, UAV 1b includes at least position information of the UAV 1a, UAV 1b. The position information of the UAV 1a, UAV 1b indicates the current position of the UAV 1a, UAV 1b. The current position of the UAV 1a, UAV 1b is a flight position of the UAV 1a, UAV 1b in flight. The aircraft information of the UAV 1a, UAV 1b may include speed information of the UAV 1a, UAV 1b. The speed information of the UAV 1a, UAV 1b indicates a flight speed of the UAV 1a, UAV 1b. Control for the UAV 1a includes control based on a dust amount detected by a dust sensor of the UAV 1a. Incidentally, the control of the UAV 1a, UAV 1b may include air traffic control such as giving information and instructions to the UAV 1a, UAV 1b in accordance with the flight status of the UAV 1a, UAV 1b.

The PMS 3 includes one or a plurality of servers and the like. The PMS 3 manages a takeoff and landing facility (hereinafter, referred to as "port"), for example, that is installed at the destination point (or the waypoint) of the UAV 1a, UAV 1b. The port is managed on the basis of port position information, port reservation information, and the like. Here, the port position information indicates an installation position of the port. The port reservation information includes: an aircraft ID of the UAV 1a, UAV 1b that has reserved the port; information on scheduled arrival time; and the like. The aircraft ID of the UAV 1a, UAV 1b is identification information to identify the UAV 1a, UAV 1b. Incidentally, there may be a case where the UAV 1a, UAV 1b lands at a point (hereinafter referred to as "temporary landing point") other than a prepared point like the port. Examples of such cases include: a case where the UAV 1a, UAV 1b can hardly keep normal flight due to a sudden change (deterioration) of the weather in the airspace where the UAV 1a, UAV 1b flies; a case where the UAV 1a, UAV 1b delivers relief articles at the time of disaster; and the like. Generally, the temporary landing point for the UAV 1a, UAV 1b is likely to have more sand dust than in prepared ports.

[1-1. Configuration and Outline of Functions of UAV 1a]

Figure 2:
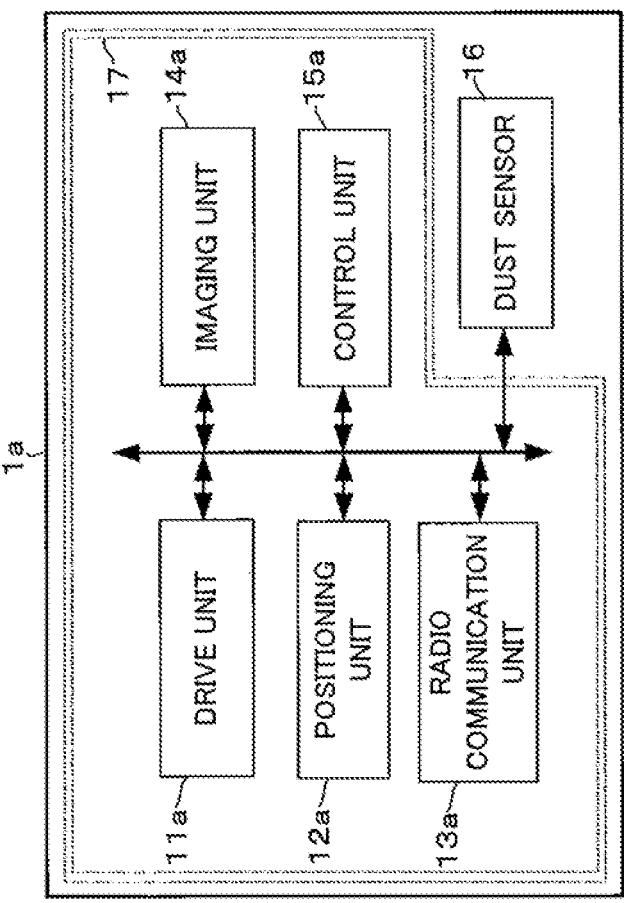

Next, a configuration and an outline of functions of the UAV 1a will be described with reference to FIG. 2. FIG. 2 is a diagram illustrating a schematic configuration example of the UAV 1a. As illustrated in FIG. 2, the UAV 1a includes a driving unit 11a, a positioning unit 12a, a radio communication unit 13a, an imaging unit 14a, a control unit 15a, a dust sensor 16, and the like. The dust sensor 16 detects dust (for example, detects dust at predetermined time intervals) in a periphery of an airframe of the UAV 1a in flight. Pieces of dust information each indicating an amount of dust detected by the dust sensor 16 are output to the control unit 15a at the predetermined time intervals. Here, the amount of dust is represented by the mass of the dust contained in 1 $m^3$, for example. Furthermore, the UAV 1a is provided with a dust-preventing function 17 that prevents at least infiltration of dust into the control unit 15a. Since the dust sensor 16 is required to detect the dust, the dust sensor is installed at least outside the control unit 15a. For example, although not particularly limited, the dust-preventing function 17 is implemented by covering, with a filter material, a vent hole connecting outside of a housing to inside of the housing where the driving unit 11a, the positioning unit 12a, the radio communication unit 13a, the imaging unit 14a, and the control unit 15a are incorporated (in this case, the dust sensor 16 is installed at a position outside the housing). Infiltration of the dust into the inside from the outside of the housing can be prevented by removing the dust by such a filter material. Incidentally, the dust-preventing function 17 may also be implemented by providing the UAV 1a with a foreign matter entry prevention means that prevents entry of a foreign matter into the inside of the housing as disclosed in JP 2018-38167 A, or may also be implemented by other known techniques.

Moreover, although not illustrated, the UAV 1a includes: rotors (propellers) that are horizontal rotary wings; various sensors used for flight control of the UAV 1a; a water sprinkling mechanism to drop (sprinkle) water (an example of liquid) that suppresses dust; a battery that supplies power to the respective units of the UAV 1a; and the like. The rotors are the horizontal rotary wings and generate vertical propulsive force. There may be a case where the UAV 1a includes fixed wings together with the rotors (for example, a case where a UAV 1a is a drone of a VTOL (Vertical TakeOff and Landing Type) type. The various sensors used for flight control of the UAV 1 include a barometric sensor, a three-axis acceleration sensor, a geomagnetic sensor, a weather sensor, and the like. The weather sensor is used for monitoring weather conditions. Detection information detected by the various sensors is output to a control unit 15a. The water sprinkling mechanism includes: a tank that stores the water; a sprinkler that drops the water; and the like. Incidentally, liquid other than the water may also be used to suppress the dust.

The drive unit 11a includes a motor, a rotating shaft, and the like. The drive unit 11a rotates the rotors with the motor, the rotating shaft, and the like that are driven in accordance with a control signal output from the control unit 15a. The positioning unit 12a includes a radio wave receiver, an altitude sensor, and the like. For example, the positioning unit 12a receives, by the radio wave receiver, a radio wave sent from a satellite of a GNSS (Global Navigation Satellite System) and detects a current position (latitude and longitude) in a horizontal direction of the UAV 1a on the basis of the radio wave. Incidentally, the current position (horizontal position) in the horizontal direction of the UAV 1a may be corrected on the basis of an image captured by the imaging unit 14a or a radio wave sent from the radio base station. Further, the positioning unit 12a may detect the current position (altitude) in a vertical direction of the UAV 1a with the altitude sensor. The position information indicating the current position detected by the positioning unit 12a is output to the control unit 15a. The radio communication unit 13a controls communication performed via the communication network NW. The imaging unit 14a includes a camera and the like. The imaging unit 14a continuously captures images of a real space within a range included in an angle of view of the camera. Incidentally, image data obtained by the imaging unit 14a is output to the control unit 15a.

The control unit 15a includes a CPU (Central Processing Unit) which is a processor, a ROM (Read Only Memory), a RAM (Random Access Memory), a non-volatile memory, and the like. The control unit 15a executes various kinds of control for the UAV 1a in accordance with a control program stored in, for example, a ROM or a non-volatile memory. The various kinds of control include takeoff control, flight control, landing control, and water sprinkling control. In the flight control and the landing control, position information acquired from the positioning unit 12a, image data acquired from the imaging unit 14a, dust information acquired from the dust sensor 16, detection information acquired from the various sensors, position information of a destination point (a waypoint or a temporary landing point may also be used, and so forth), and the like are used to perform: rotor drive control; and control for a position, a posture, and a travel direction of the UAV 1a. In such flight control, for example, flight plan information (indicating a flight route of the UAV 1a, for example) acquired from the UTMS 2 may also be used. On the other hand, the water sprinkling control is performed by a water sprinkling control command from, for example, the UTMS2 or a GCS. For example, the control unit 15a drops (sprinkles) water that suppresses dust, for example, at a destination point of the UAV 1a or the UAV 1b in accordance with the water sprinkling control command.

Incidentally, during the flight of the UAV 1a, the control unit 15a periodically transmits, to the UTMS 2, the aircraft information of the UAV 1a together with the aircraft ID of the UAV 1a via a radio communication unit 13. Moreover, the autonomous flight of the UAV 1a is not limited to the autonomous flight performed under the flight control of the control unit 15a provided in the UAV 1a, and the autonomous flight of the UAV 1a also includes, for example, autonomous flight performed by flight control as the entire flight system S.

Moreover, during flight of the UAV 1a, the control unit 15a (an example of a processing unit) acquires the dust information from the dust sensor 16 and performs dust prevention processing for the different UAV 1b not provided with any dust-preventing function, in accordance with a dust prevention processing program stored in, for example, the ROM or the non-volatile memory. In such dust prevention processing, the control unit 15a transmits the dust information to a different device via the radio communication unit 13a together with an aircraft ID of the UAV 1a, for example. Consequently, the dust prevention measures can be taken for the different device on the basis of the pieces of dust information. At this time, it is preferable that aircraft information including position information of the UAV 1a be transmitted to the different device. Here, examples of the different device to which the dust information is transmitted can include the control server CS, the UAV 1*b*, or the GCS that manages the UAV 1*b*. Moreover, in the flight control during a period of transmitting the pieces of dust information at the predetermined time intervals, it is preferable that the control unit 15*a* change a travel route of the UAV 1*a*, on the basis of dust amounts indicated by the respective pieces of dust information from the dust sensor 16, such that each of the dust amounts becomes a first threshold value or less (for example, until each of the dust amounts becomes the first threshold value or less). Changing the travel route of the UAV 1*a* includes, for example, making the UAV 1*a* ascend or descend, moving the UAV 1*a* leftward or rightward, making the UAV 1*a* circle around, making the UAV 1*a* return to a predetermined point and fly along a different route, or the like.

Incidentally, the pieces of dust information transmitted to the control server CS are used to designate (determine) a flight route where the UAV 1*b* is hardly affected by dust as described later. However, in the dust prevention processing, the control unit 15*a* does not necessarily transmit the pieces of dust information to the control server CS, and may designate, on the basis of the dust amounts indicated by the above-described pieces of dust information, the flight route where the UAV 1*b* is hardly affected by the dust. In this case, the control unit 15*a* designates the flight route by seeking a route where the UAV 1*b* is hardly affected by the dust while the control unit changes the travel route of the UAV 1*a* on the basis of, for example, the dust amounts indicated by the pieces of dust information acquired from the dust sensor 16 at the predetermined time intervals such that each of the dust amounts becomes a second threshold value or less. Consequently, the flight route where the UAV 1*b* is hardly affected by the dust can be more efficiently designated.

Here, the route where the UAV 1*b* is hardly affected by the dust is, for example, a route where each of the dust amounts indicated by the pieces of dust information (an average value or a minimum value of the dust amounts acquired a plurality of times may also be used) becomes the second threshold value or less. In a case where the flight route is designated by the control server CS, the second threshold value is a value smaller than the first threshold value (that is, a value that is stricter than the first threshold value), and it is preferable to preset the second threshold value according to the different aerial vehicle (e.g., UAV 1*b*) not provided with the dust-preventing function. On the other hand, in a case where the flight route is designated by the control unit 15*a*, the second threshold value is to be set to a value same as the first threshold value. Then, in the dust prevention processing, the control unit 15*a* performs the flight control of the UAV 1*a* while making the UAV 1*b* follow after the UAV 1*a* along the flight route (for example, on the flight route) designated by the control server CS or the control unit 15*a*. Consequently, the UAV 1*b* can be adequately guided so as not to be affected by the dust. Alternatively, the control unit 15*a* may transmit, to the different device (e.g., the UAV 1*b*), information indicating the flight route designated by the control server CS or the control unit 15*a*, via the radio communication unit 13*a* together with the aircraft ID of the UAV 1*a*. Consequently, the UAV 1*b* can be made to fly along the flight route hardly affected by the dust.

Moreover, the pieces of dust information transmitted to the control server CS may also be utilized for water sprinkling determination to suppress the dust at the destination point of the UAV 1*b*. In this case, the control unit 15*a* drops the water that suppresses the dust at, for example, the destination point in accordance with a water sprinkling control command based on the water sprinkling determination by the control server CS. Consequently, the dust can be suppressed to such an extent that the UAV 1*b* is not affected by the dust. However, in the dust prevention processing, the control unit 15*a* does not necessarily transmit the pieces of dust information to the control server CS and may drop the water that suppresses the dust by performing the water sprinkling determination by itself on the basis of the dust amounts indicated by the above-described pieces of dust information.

[1-2. Configuration and Outline of Functions of UAV 1*b*]

Figure 3:
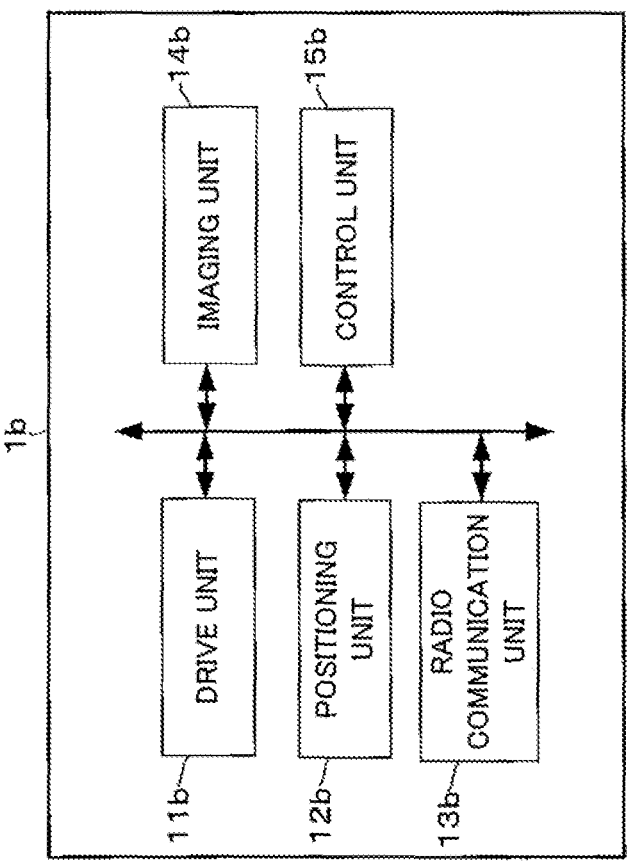
FIG. 3 is a diagram illustrating a schematic configuration example of an UAV 1b.

Next, a configuration and an outline of functions of the UAV 1*b* will be described with reference to FIG. 3. FIG. 3 is a diagram illustrating a schematic configuration example of the UAV 1*b*. As illustrated in FIG. 3, the UAV 1*b* includes a driving unit 11*b*, a positioning unit 12*b*, a radio communication unit 13*b*, an imaging unit 14*b*, a control unit 15*b*, and the like. The UAV 1*b* is not provided with the dust-preventing function that prevents infiltration of dust. Configurations and functions of the driving unit 11*b*, the positioning unit 12*b*, the radio communication unit 13*b*, and the imaging unit 14*b* are similar to the configurations and the functions of the driving unit 11*a*, the positioning unit 12*a*, the radio communication unit 13*a*, and the imaging unit 14*a* of the UAV 1*a*. Incidentally, the UAV 1*b* may include a dust sensor that detects dust in a periphery of an airframe of the UAV 1*b* in flight. Moreover, the UAV 1*b* includes: rotors that are horizontal rotary wings similar to those of the UAV 1*a*; various sensors; a battery; and the like, although not illustrated. Similarly to the UAV 1*a*, the UAV 1*b* may also have fixed wings together with the rotors.

The control unit 15*b* includes: a CPU that is a processor; a ROM; a RAM; a non-volatile memory; and the like. The control unit 15*b* executes various kinds of control for the UAV 1*b* in accordance with a control program stored in, for example, the ROM or the non-volatile memory. The various kinds of control include takeoff control, flight control, and landing control. In the flight control and the landing control, information acquired from the positioning unit 12*b*, image data acquired from the imaging unit 14*b*, detection information acquired from the various sensors, information of a destination point, and the like are used to: perform rotor drive control; and control for a position, a posture, and a travel direction of the UAV 1*b*. In such flight control, for example, information indicating a flight route designated by the control server CS or the UAV 1*a* may be used. Incidentally, the UAV 1*b* may include an automatic follow function to fly in a manner following after the UAV 1*a*.

[1-3. Configuration and Outline of Functions of Control Server CS]

Figure 4:
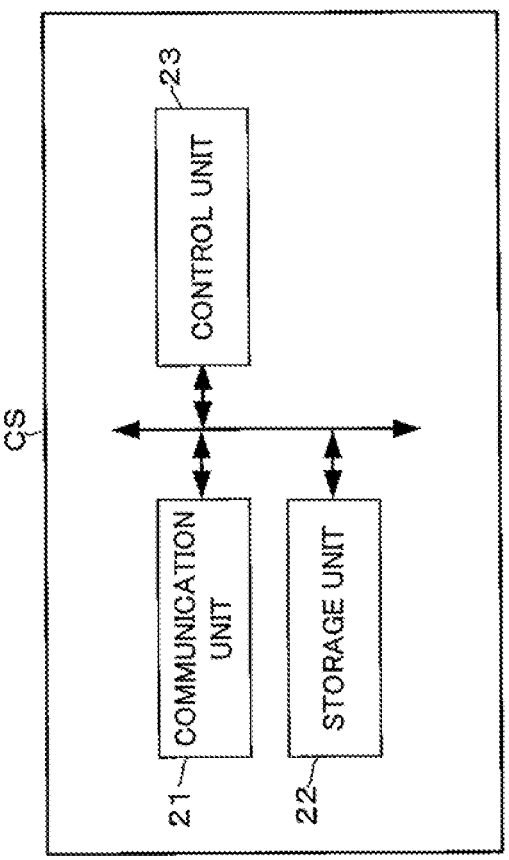
FIG. 4 is a diagram illustrating a schematic configuration example of a control server CS.
Figure 5:
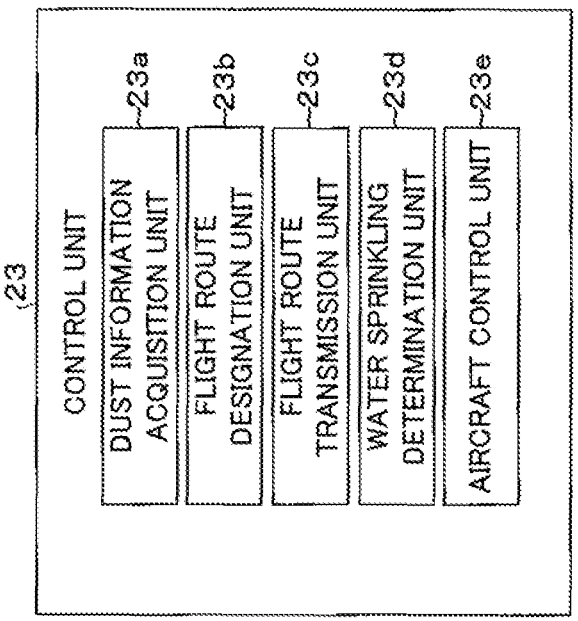
FIG. 5 is a diagram illustrating exemplary functional blocks in a control unit 23.

Next, a configuration and an outline of functions of the control server CS will be described with reference to FIGS. 4 and 5. FIG. 4 is a diagram illustrating a schematic configuration example of the control server CS. As illustrated in FIG. 4, the control server CS includes a communication unit 21, a storage unit 22, a control unit 23, and the like. The communication unit 21 controls communication performed via a communication network NW. The storage unit 22 includes, for example, a hard disk drive and the like. The storage unit 22 stores, in a correlated manner, an aircraft ID of each of the UAV 1*a* and the UAV 1*b* and aircraft information of each of the UAV 1*a* and the UAV 1*b*.

The control unit 23 includes: a CPU that is a processor; a ROM; a RAM; a non-volatile memory; and the like. FIG. 5 is a diagram illustrating exemplary functional blocks in the control unit 23. As illustrated in FIG. 5, the control unit 23 functions as a dust information acquisition unit 23*a*, a flight route designation unit 23*b*, a flight route transmission unit 23*c*, a water sprinkling determination unit 23*d*, an aircraft control unit 23*e*, and the like in accordance with a program stored in the ROM or the non-volatile memory, for example. Incidentally, the dust information acquisition unit 23*a* is an example of an acquisition unit. The flight route designation unit 23*b* is an example of a designation unit. The flight route transmission unit 23*c* is an example of a transmission unit. The water sprinkling determination unit 23*d* is an example of a determination unit.

During the flight of the UAV 1*a*, the dust information acquisition unit 23*a* acquires pieces of dust information at predetermined time intervals from, for example, the UAV 1*a* or the GCS together with the aircraft ID of the UAV 1*a*, and the pieces of the dust information each indicating the dust amount are detected by dust sensor 16. Each of the pieces of dust information thus acquired is stored in the storage unit 22 in time series in a manner correlated to the aircraft ID of the UAV 1*a* and each acquisition time, for example. Incidentally, in a case where the aircraft information including the aircraft information of the UAV 1*a* is received together with each piece of dust information, the aircraft information of the UAV 1*a* is stored in the storage unit 22 in a manner correlated to each piece of the dust information.

The flight route designation unit 23*b* designates (determines), on the basis of the amount of dust indicated by the dust information acquired by the dust information acquisition unit 23*a*, a flight route where the UAV 1*b* is hardly affected by the dust. For example, it is preferable that the flight route designation unit 23*b* time-sequentially retrieve, from among the pieces of dust information stored in time series in the storage unit 22, a plurality of pieces of dust information each indicating the dust amount being the second threshold value or less, and create a flight route on the basis of the position information correlated to each of the retrieved plurality of pieces of dust information.

The flight route transmission unit 23*c* transmits, to the UAV 1*b* or the GCS that manages the UAV 1*b*, information indicating the flight route designated by the flight route designation unit 23*b*. Consequently, the UAV 1*b* can be made to fly along the flight route hardly affected by the dust. Alternatively, the flight route transmission unit 23*c* may transmit, to the UAV 1*a* or the GCS that manages the UAV 1*a*, the information indicating the flight route designated by the flight route designation unit 23*b*.

The water sprinkling determination unit 23*d* determines whether or not to drop water that suppresses dust at a destination point of the UAV 1*b* (water sprinkling determination) on the basis of an amount of dust indicated by the information acquired by the dust information acquisition unit 23*a*. Consequently, the dust can be suppressed to such an extent that the UAV 1*b* is not affected by the dust. For example, in a case where the dust amount indicated by a piece of dust information acquired by the dust information acquisition unit 23*a* is a third threshold value or more, the water sprinkling determination unit 23*d* determines to drop the water that suppresses the dust.

The aircraft control unit 23*e* controls the UAV 1*a* on the basis of the amount of dust indicated by the dust information acquired by the dust information acquisition unit 23*a*. Such control is performed by transmitting, for example, to the UAV 1*a* or the GCS that manages the UAV 1*a*, a water sprinkling control command based on the water sprinkling determination. That is, in a case where it is determined to drop the water that suppresses the dust, the UAV 1*a* is controlled so as to drop the water by transmitting the water sprinkling control command based on the water sprinkling determination.

[2. Operation of Flight System S]

Next, operation of the flight system S will be described for Example 1 and Example 2 separately.

Example 1

Figure 6:
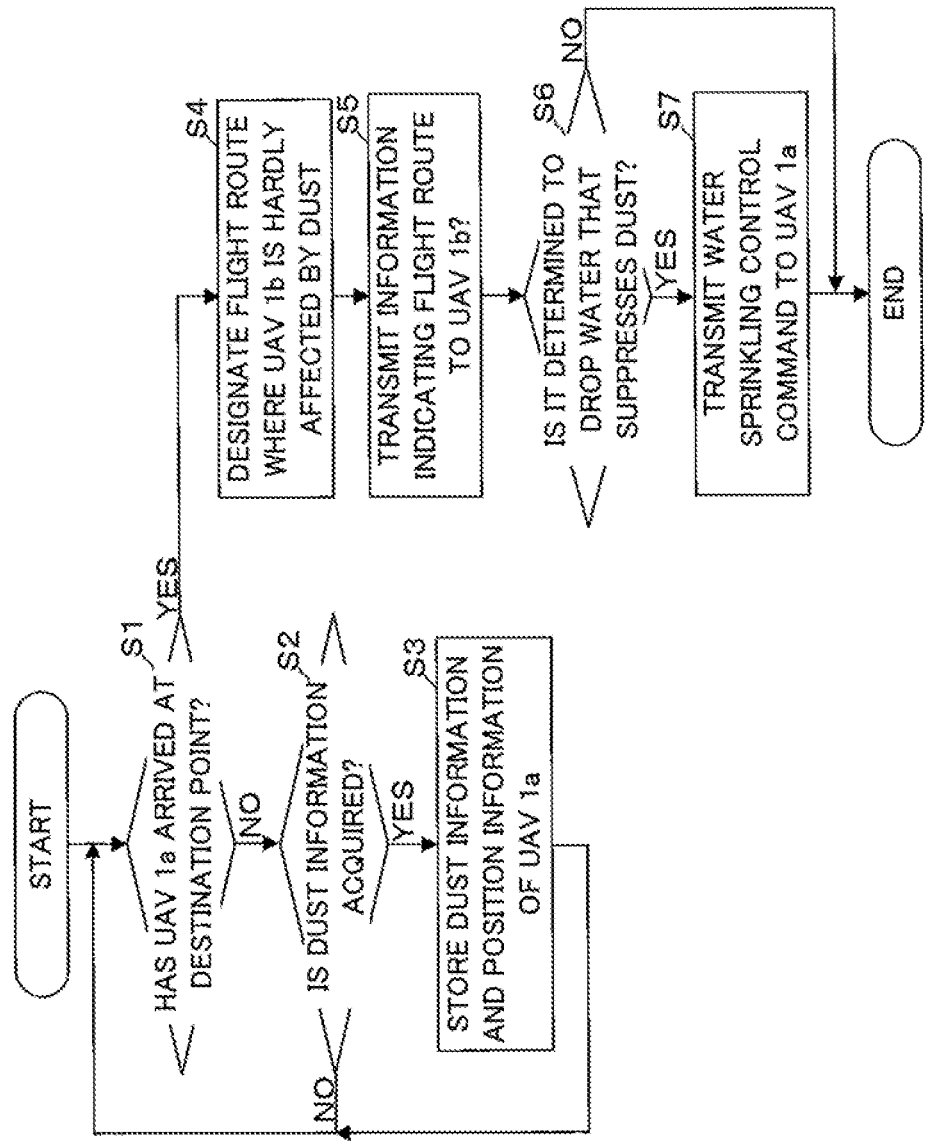
FIG. 6 is a flowchart illustrating exemplary processing executed by a control unit 23 of a control server CS in Example 1.

First, Example 1 of the operation of the flight system S will be described with reference to FIG. 6. FIG. 6 is a flowchart illustrating exemplary processing executed by the control unit 23 of the control server CS in Example 1. In Example 1, the UAV 1*a* flies from a departure point to a destination point of the UAV 1*b* in order to designate a flight route where the UAV 1*b* scheduled to fly is hardly affected by dust. Then, the UAV 1*a* acquires, during the flight thereof, pieces of dust information from the dust sensor 16 at predetermined time intervals, and transmits each piece of the dust information to the control server CS together with the aircraft ID and the aircraft information of the UAV 1*a*. Incidentally, it is preferable that the UAV 1*a* fly while changing a travel route of the UAV 1*a* on the basis of the dust amounts indicated by the acquired pieces of dust information such that each of the dust amounts becomes the first threshold value or less.

The processing illustrated in FIG. 6 is started when the flight of the UAV 1*a* is started. When the processing illustrated in FIG. 6 is started, the control unit 23 determines whether or not the UAV 1*a* has arrived at the destination point (step S1). For example, the determination on arrival at the destination point is performed by determining, on the basis of the position information of the UAV 1*a* and position information of the destination point, whether or not a current position of the UAV 1*a* has entered a vicinity range (e.g., several meters) of the destination point. In a case where the control unit 23 determines that the UAV 1*a* has not arrived at the destination point (step S1: NO), the processing proceeds to step S2. On the other hand, in a case where the control unit 23 determines that the UAV 1*a* has arrived at the destination point (step S1: YES), the processing proceeds to step S4.

In step S2, the control unit 23 determines whether or not the dust information indicating the amount of dust detected by the UAV 1*a* is acquired via the communication unit 21. In a case where the control unit 23 determines that the dust information is not acquired (step S2: NO), the processing returns to step S1. On the other hand, in a case where the control unit 23 determines that the dust information is acquired (step S2: YES), the acquired dust information is stored in the storage unit 22 in a manner correlated to acquisition time thereof and the position information of the UAV 1*a* (step S3). Consequently, the pieces of dust information acquired at the predetermined time intervals are stored in the storage unit 22 in time series.

In step S4, the control unit 23 designates, on the basis of the dust amount indicated by the dust information stored in step S3, a flight route where the UAV 1*b* is hardly affected by the dust. For example, the control unit 23 time-sequentially retrieves, from among the pieces of dust information stored in time series in the storage unit 22, a plurality of pieces of dust information each indicating a dust amount being the second threshold value or less. Then, the control unit 23 designates a flight route on the basis of the position information correlated to each of the retrieved plurality of pieces of dust information. For example, a flight route that passes through a position (for example, latitude, longitude, and altitude) indicated by each of the plurality of pieces of position information is designated.

Incidentally, in step S4, the control unit 23 may divide the continuously-acquired pieces of the dust information into dust information groups each including predetermined pieces (e.g., ten to one hundred pieces) of dust information, and calculate an average value of the dust amounts in each of dust information groups. In this case, the control unit 23 time-sequentially retrieves a plurality of dust information groups in which the average value of the dust amounts is the second threshold value or less, identifies a representative piece of position information in each of the retrieved dust information groups, and designates a flight route on the basis of identified pieces of position information. Here, it is preferable that the representative piece of position information be, for example, a piece of position information correlated to a piece of dust information acquired most recently out of the plurality of pieces of dust information included in each dust information group.

Subsequently, in step S5, the control unit 23 transmits, to the UAV 1b, the information indicating the flight route designated in step S4. Incidentally, the information indicating the flight route may also be transmitted to the UAV 1b via the GCS. Then, when the UAV 1b receives the information indicating the flight route, the UAV 1b starts flying from the departure point to the destination point along this flight route. Incidentally, when the UAV 1b receives the information indicating the flight route, the UAV 1b may be flying along a preset flight route. In this case, when the UAV 1b receives the information indicating the flight route, the UAV 1b changes the current flight route to the new flight route and continues the flight toward the destination point along the changed flight route.

Subsequently, the control unit 23 determines whether or not to drop the water that suppresses dust at the destination point on the basis of the dust amount indicated by the dust information acquired at the time of arriving at the destination point out of the pieces of dust information stored in step S3 (step S6). For example, in a case where the dust amount indicated by the dust information is the third threshold value or more, the control unit 23 determines to drop the water that suppresses the dust (step S6: YES), and the processing proceeds to step S7.

Incidentally, in a case where an average value of dust amounts indicated respectively by a plurality of pieces of dust information acquired at the time of arriving at the destination point is the third threshold value or more, it may be determined to drop the water that suppresses the dust. On the other hand, in the case where the dust amount indicated by the dust information is not the third threshold value or more, the control unit 23 determines not to drop the water that suppresses the dust (step S6: NO), and ends the processing illustrated in FIG. 6.

In step S7, the control unit 23 transmits, to the UAV 1a, a water sprinkling control command based on the water sprinkling determination, and ends the processing illustrated in FIG. 6. The water sprinkling control command may also be transmitted to the UAV 1 via the GCS. Then, the UAV 1a drops the water that suppresses the dust from the sky above the destination point by the water sprinkling control in accordance with the water sprinkling control command from the control server CS.

Example 2

Figure 7:
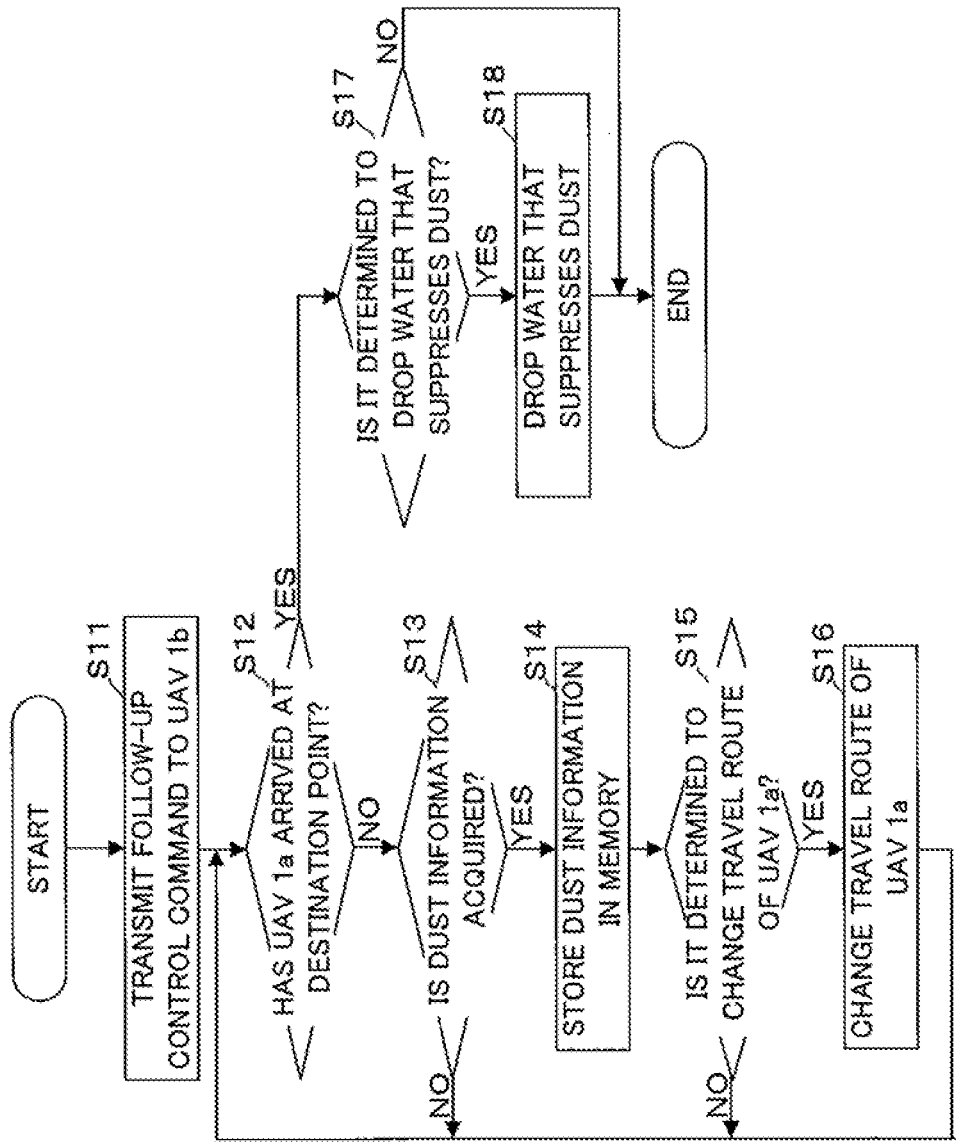
FIG. 7 is a flowchart illustrating exemplary processing executed by a control unit 15a of an UAV 1a in Example 2.

Next, Example 2 of the operation of the flight system S will be described with reference to FIG. 7. FIG. 7 is a flowchart illustrating exemplary processing executed by the control unit 15a of the UAV 1a in Example 2. In Example 2, the UAV 1a flies from a departure point to a destination point while selecting a flight route where the UAV 1b is hardly affected by dust, and making the UAV 1b follow after the UAV 1a.

The processing illustrated in FIG. 7 is started when the flight of the UAV 1a is started by the flight control of the control unit 15a. When the processing illustrated in FIG. 7 is started, the control unit 15a transmits, to the UAV 1b, a follow-up control command to make the UAV 1b follow after the UAV 1a (step S11). Incidentally, the follow-up control command may be transmitted from the control server CS to the UAV 1b. The follow-up control command includes, for example, the aircraft ID of the UAV 1a. When the UAV 1b receives the follow-up control command, the UAV 1b activates the automatic follow function and captures, by the imaging unit 14b, an image of an identification mark attached to a surface of the UAV 1a. Then, the UAV 1b extracts the ID from the identification mark captured by the imaging unit 14b through image analysis, and compares the extracted ID with the aircraft ID included in the follow-up control command, and in a case where the IDs are identical, the UAV 1b starts flying in a manner following after the UAV 1a and flies along the above-described flight route while following after the UAV 1a in accordance with the follow-up control command.

Subsequently, the UAV 1a determines whether or not the UAV 1a has arrived at the destination point (step S12). In a case where the control unit 15a determines that the UAV 1a has not arrived at the destination point (step S12: NO), the processing proceeds to step S13. On the other hand, in a case where the control unit 15a determines that the UAV 1a has arrived at the destination point (step S12: YES), the processing proceeds to step S17.

In step S13, the control unit 15a determines whether or not the dust information indicating the dust amount detected by the dust sensor 16 are acquired. In a case where the control unit 15a determines that the dust information is not acquired (step S13: NO), the processing returns to step S12. On the other hand, in a case where the control unit 15a determines that the dust information is acquired (step S13: YES), the control unit 15a stores the acquired dust information in the memory (step S14).

Subsequently, the control unit 15a determines whether or not to change a travel route of the UAV 1a on the basis of the dust amount indicated by the dust information stored in step S14 (step S15). For example, in a case where the dust amount indicated by the stored dust information is not the second threshold value or less, the control unit 15a determines to change the travel route of the UAV 1a (step S15: YES), and the processing proceeds to step S16.

Incidentally, in a case where an average value or a minimum value of the dust amounts respectively indicated by the plurality of stored pieces of dust information is not the second threshold value or less, it may be determined to change the travel route of the UAV 1a. On the other hand, in a case where the dust amount indicated by the stored dust information is the second threshold value or less, the control unit 15a determines not to change the travel route of the UAV 1a (step S15: NO), and the processing returns to step S12.

In step S16, the control unit 15a changes the travel route of the UAV 1a by performing the flight control such that each of the dust amounts (an average value or a minimum value of the dust amounts may also be used) becomes the second threshold value or less, and the processing returns to step S12. Incidentally, the flight control to change the travel route of the UAV 1*a* may be continuously performed for a predetermined period.

In step S17, the control unit 15*a* determines whether or not to drop the water that suppresses the dust at the destination point, on the basis of the dust amount indicated by the dust information acquired at the time of arriving at the destination point out of the pieces of dust information stored in step S14. For example, in a case where the dust amount indicated by the dust information is the third threshold value or more, the control unit 15*a* determines to drop the water that suppresses the dust (step S17: YES), and the processing proceeds to step S18.

Incidentally, in a case where an average value of dust amounts indicated respectively by a plurality of pieces of dust information acquired at the time of arriving at the destination point is the third threshold value or more, it may be determined to drop the water that suppresses the dust. On the other hand, in the case where the dust amount indicated by the dust information is not the third threshold value or more, the control unit 15*a* determines not to drop the water that suppresses the dust (step S17: NO), and ends the processing illustrated in FIG. 7.

In step S18, the control unit 15*a* drops the water that suppresses the dust from the sky above the destination point by the water sprinkling control.

As described above, according to the above-described embodiment, the UAV 1*a* includes the dust sensor 16 and the dust-preventing function 17 and performs, on the basis of the dust amount detected by the dust sensor 16 during the flight of the UAV 1*a*, the processing for the different UAV 1*b* not provided with the dust-preventing function, and therefore, the dust prevention measures can be taken such that the UAV 1*b* not provided with the dust-preventing function is less affected by the dust. Moreover, according to the above-described embodiment, a flight route where the UAV 1*b* not provided with the dust-preventing function is hardly affected by the dust can be designated on the basis of the dust amount detected by the dust sensor 16 during the flight of the UAV 1*a*, and therefore, the dust prevention measures can be taken such that the UAV 1*b* not provided with any dust-preventing function is less affected by the dust.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. For example, in the above-described embodiment, the description has been provided by exemplifying, as the different aerial vehicle, the UAV 1*b* not provided with the dust-preventing function, but an unmanned aerial vehicle provided with the dust-preventing function is also applicable as a different aerial vehicle. Moreover, in the above-described embodiment, the description has been provided by exemplifying an unmanned aerial vehicle as the different aerial vehicle, but the present invention is also applicable to a manned aerial vehicle operated by an operator (pilot) or a manned aerial vehicle capable of flying without an operator inside the aerial vehicle. A person other than the operator (for example, a passenger) may board each of these manned aerial vehicles.

REFERENCE SIGNS LIST

1*a*, 1*b* UAV
2 UTMS
3 PMS
CS Control server
11*a*, 11*b* Drive unit
12*a*, 12*b* Positioning unit
13*a*, 13*b* Radio communication unit
14*a*, 14*b* Imaging unit
15*a*, 15*b* Control unit
16 Dust sensor
17 Dust-preventing function
21 Communication unit
22 Storage unit
23 Control unit
23*a* Dust information acquisition unit
23*b* Flight route designation unit
23*c* Flight route transmission unit
23*d* Water sprinkling determination unit
23*e* Aircraft control unit
S Flight system

The invention claimed is:

1. A processing system including an unmanned aerial vehicle provided with: a dust-preventing function that prevents at least infiltration of dust into the control unit; and a sensor that is installed at least outside the control unit and detects dust; and a second aerial vehicle, the processing system comprising:
   at least one memory configured to store program code; and at least one processor configured to access the program code and operate as instructed by the program code, the program code including:
   acquisition code configured to cause the at least one processor to acquire information indicating a first amount of dust detected by the sensor during flight of the unmanned aerial vehicle; and
   designation code configured to cause the at least one processor to designate, on the basis of the first amount of dust, a flight route of the second aerial vehicle having a second amount of dust below a threshold value, wherein the second aerial vehicle is a different vehicle than the unmanned aerial vehicle; and
   control code configured to cause the at least one processor to transmit, to the second aerial vehicle, a follow-up control command including an ID of the unmanned aerial vehicle,
   wherein the second aerial vehicle captures, by a camera, an image of an identification mark attached to a surface of the unmanned aerial vehicle in response to receiving the follow-up control command, extracts an ID from the captured identification mark through image analysis, compares the extracted ID with the ID included in the follow-up control command, and based on the compared IDs being identical, flies along the flight route while following after the unmanned aerial vehicle in accordance with the follow-up control command.

2. The processing system according to claim 1, the program code further including transmission code configured to cause the at least one processor to transmit, to the second aerial vehicle, information indicating the flight route.

3. The processing system according to claim 1, the program code further including determination code configured to cause the at least one processor to determine, on the basis of the first amount of dust, whether or not to drop liquid that suppresses the dust.

4. A flight route designation method performed by a processing system including an unmanned aerial vehicle provided with:
   a control unit that controls flight;

a dust-preventing function that prevents at least infiltration of dust into the control unit; and a sensor that is installed at least outside the control unit and detects dust; and a second aerial vehicle, the flight route designation method including:

acquiring information indicating a first amount of dust detected by the sensor during flight of the unmanned aerial vehicle;

designating, on the basis of the first amount of dust, a flight route of the second aerial vehicle having a second amount of dust below a threshold value, wherein the second aerial vehicle is a different vehicle than the unmanned aerial vehicle;

transmitting, from the unmanned aerial vehicle to the second aerial vehicle, a follow-up control command including an ID of the unmanned aerial vehicle;

capturing, by a camera of the second aerial vehicle, an image of an identification mark attached to a surface of the unmanned aerial vehicle in response to receiving the follow-up control command by the second aerial vehicle;

extracting, by the second aerial vehicle, an ID from the captured identification mark through image analysis;

comparing, by the second aerial vehicle, the extracted ID with the ID included in the follow-up control command, and controlling the second aerial vehicle, based on the compared IDs being identical, such that the second aerial vehicle files along the flight route while following after the unmanned aerial vehicle in accordance with the follow-up control command.

5. The processing system according to claim 1, wherein the second aerial vehicle is not provided with any dust-preventing function, and the threshold value is preset according to the second aerial vehicle.

* * * * *